United States Patent
Yamauchi et al.

(10) Patent No.: US 7,808,492 B2
(45) Date of Patent: Oct. 5, 2010

(54) IMAGE FORMING APPARATUS FOR DISPLAYING INFORMATION ON DISPLAY UNIT REMOVABLE FROM APPARATUS MAIN BODY

(75) Inventors: Kana Yamauchi, Toyohashi (JP); Hideyuki Hashimoto, Toyokawa (JP); Takeshi Hibino, Toyokawa (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 906 days.

(21) Appl. No.: 11/606,156

(22) Filed: Nov. 30, 2006

(65) Prior Publication Data

US 2008/0048998 A1    Feb. 28, 2008

(30) Foreign Application Priority Data

Aug. 22, 2006 (JP) .............................. 2006-225449

(51) Int. Cl.
*G06F 3/038* (2006.01)
(52) U.S. Cl. ........................... 345/204; 345/1.1; 345/2.1
(58) Field of Classification Search ........... 345/1.1–1.3, 345/204, 2.1–2.3, 3.1–3.4
See application file for complete search history.

(56) References Cited

U.S. PATENT DOCUMENTS

| 4,804,830 | A | 2/1989 | Miyagisima et al. | |
|---|---|---|---|---|
| 2002/0111139 | A1 | 8/2002 | Nishiyama et al. | |
| 2002/0193149 | A1* | 12/2002 | Tanaka et al. | 455/566 |
| 2004/0048571 | A1 | 3/2004 | Kiyose | |
| 2005/0168399 | A1* | 8/2005 | Palmquist | 345/1.1 |

FOREIGN PATENT DOCUMENTS

| JP | 02-147545 | 6/1990 |
|---|---|---|
| JP | 4-95103 | 3/1992 |
| JP | 6-075454 | 3/1994 |
| JP | 08-039894 | 2/1996 |
| JP | 08-146688 | 6/1996 |
| JP | 2512707 | 7/1996 |
| JP | 09-134049 | 5/1997 |
| JP | 11-203539 | 7/1999 |
| JP | 2003-299135 | 10/2003 |
| JP | 3528495 | 5/2004 |
| JP | 2004-302307 | 10/2004 |
| JP | 2005-107992 | 4/2005 |

(Continued)

OTHER PUBLICATIONS

Translation of Japanese Notice of Grounds of Rejection mailed Jul. 8, 2008, directed to counterpart JP application No. 2006-225449; 4 pages.

(Continued)

*Primary Examiner*—Amare Mengistu
*Assistant Examiner*—Dmitriy Bolotin
(74) *Attorney, Agent, or Firm*—Morrison & Foerster LLP

(57) ABSTRACT

An image forming apparatus includes an apparatus main body and a display unit that is removable from the apparatus main body. A positional relationship between the display unit and the apparatus main body and a direction are detected by a detecting portion. Based on results of the detection and apparatus conditions, content to be displayed on a displaying portion of the display unit is determined.

13 Claims, 18 Drawing Sheets

FOREIGN PATENT DOCUMENTS

JP    2005-128039    5/2005

OTHER PUBLICATIONS

European Search Report dated Nov. 26, 2006, directed to EP Application No. 06025026.3. (5 pages).

European Search Report dated Nov. 26, 2007, directed to EP Application No. 06025026.3. (5 pages).

Japanese Notice of Grounds of Rejection mailed May 19, 2009, directed to counterpart Japanese Application No. 2006-225449; (12 pages).

* cited by examiner

PAPER JAM HAS OCCURRED AT RIGHT SIDE SURFACE. CLOSE FRONT DOOR CURRENTLY BEING OPEN AND OPEN DOOR AT RIGHT SIDE SURFACE.

PAPER JAM HAS OCCURRED AT SIDE OF
PAPER FEED CASSETTE.
OPEN SHADED DOOR.

PAPER JAM HAS OCCURRED AT RIGHT SIDE SURFACE.
OPEN DOOR IN FRONT OF YOU.

PAPER JAM HAS OCCURRED AT RIGHT SIDE SURFACE.
CLOSE FRONT DOOR CURRENTLY BEING OPEN AND
OPEN DOOR AT RIGHT SIDE SURFACE.

PAPER JAM HAS OCCURRED IN
FUSING PORTION.
HANDLE JAM FROM DOOR AT
RIGHT SIDE SURFACE.

●JAM FREQUENCY
FUSING PORTION : 3/144
PAPER FEED CASSETTE 1 : 2/120
PAPER FEED CASSETTE 2 : 1/ 79

*TROUBLE*
NONE AT PRESENT
TIME

FIG.17

| USER/MACHINE CONDITIONS | MAIN BODY DOOR OPEN AND CLOSE /DETACHABLE DISPLAY LOCATION | | STATE IN WHICH DOOR (CASSETTE) IS OPEN | | | | |
|---|---|---|---|---|---|---|---|
| | | | AROUND FRONT DOOR | AROUND PAPER FEED CASSETTE | AROUND SIDE DOOR | BACKSIDE OF MACHINE | FAR LOCATION |
| UPON USE BY GENERAL USER | UPON OCCURRENCE OF TROUBLE | | INSTRUCT TO CONTACT SERVICE ENGINEER | INSTRUCT TO CONTACT SERVICE ENGINEER | INSTRUCT TO CONTACT SERVICE ENGINEER | — | INFORM OF OCCURRENCE OF TROUBLE |
| | UPON OCCURRENCE OF JAM | PAPER FEED SLOT | INSTRUCT TO CLOSE FRONT DOOR AND OPEN PAPER FEED CASSETTE | INDICATE DETAILED OCCURRENCE LOCATION AND INSTRUCT NEXT STEP | INSTRUCT TO CLOSE SIDE DOOR AND OPEN PAPER FEED CASSETTE | — | INFORM THAT DOOR IS BEING OPEN AND JAM HAS OCCURRED |
| | | FUSING PORTION | INSTRUCT TO CLOSE FRONT DOOR AND OPEN SIDE DOOR | INSTRUCT TO CLOSE PAPER FEED CASSETTE AND OPEN SIDE DOOR | INDICATE DETAILED OCCURRENCE LOCATION AND INSTRUCT NEXT STEP | — | INFORM THAT DOOR IS BEING OPEN AND JAM HAS OCCURRED |
| | | PAPER EJECTING PORTION | INSTRUCT TO CLOSE FRONT DOOR AND OPEN EJECT SLOT | INSTRUCT TO CLOSE PAPER FEED CASSETTE AND OPEN EJECT SLOT | INSTRUCT TO CLOSE SIDE DOOR AND OPEN EJECT SLOT | — | INFORM THAT DOOR IS BEING OPEN AND JAM HAS OCCURRED |
| | OCCURRENCE OF ATTENTION | | INSTRUCT TO CLOSE FRONT DOOR | INSTRUCT TO CLOSE PAPER FEED CASSETTE | INSTRUCT TO CLOSE SIDE DOOR | — | INFORM THAT DOOR IS BEING OPEN |
| | NORMAL TIME | | INSTRUCT TO CLOSE FRONT DOOR | INSTRUCT TO CLOSE PAPER FEED CASSETTE | INSTRUCT TO CLOSE SIDE DOOR | — | INFORM THAT DOOR IS BEING OPEN |

BAD CONDITIONS ←

FIG.18

| USER/MACHINE CONDITIONS | | MAIN BODY DOOR OPEN AND CLOSE /DETACHABLE DISPLAY LOCATION | STATE IN WHICH DOOR (CASSETTE) IS OPEN | | | | |
|---|---|---|---|---|---|---|---|
| | | | AROUND FRONT DOOR | AROUND PAPER FEED CASSETTE | AROUND SIDE DOOR | BACKSIDE OF MACHINE | FAR LOCATION |
| UPON USE BY SERVICE ENGINEER | UPON OCCURRENCE OF TROUBLE | | INFORM OF DESCRIPTION OF TROUBLE | INFORM OF DESCRIPTION OF TROUBLE | INFORM OF DESCRIPTION OF TROUBLE | INFORM OF DESCRIPTION OF TROUBLE | INFORM OF DESCRIPTION OF TROUBLE |
| | UPON OCCURRENCE OF JAM | PAPER FEED SLOT | DISPLAY JAM LOCATION AND OCCURRENCE FREQUENCY | DISPLAY JAM LOCATION AND OCCURRENCE FREQUENCY | DISPLAY JAM LOCATION AND OCCURRENCE FREQUENCY | DISPLAY JAM LOCATION AND OCCURRENCE FREQUENCY | INFORM THAT DOOR IS BEING OPEN AND JAM HAS OCCURRED |
| | | FUSING PORTION | DISPLAY JAM LOCATION AND OCCURRENCE FREQUENCY | DISPLAY JAM LOCATION AND OCCURRENCE FREQUENCY | DISPLAY JAM LOCATION AND OCCURRENCE FREQUENCY | DISPLAY JAM LOCATION AND OCCURRENCE FREQUENCY | INFORM THAT DOOR IS BEING OPEN AND JAM HAS OCCURRED |
| | | PAPER EJECTING PORTION | DISPLAY JAM LOCATION AND OCCURRENCE FREQUENCY | DISPLAY JAM LOCATION AND OCCURRENCE FREQUENCY | DISPLAY JAM LOCATION AND OCCURRENCE FREQUENCY | DISPLAY JAM LOCATION AND OCCURRENCE FREQUENCY | INFORM THAT DOOR IS BEING OPEN AND JAM HAS OCCURRED |
| | OCCURRENCE OF ATTENTION | | DISPLAY THAT FRONT DOOR IS BEING OPEN AND MACHINE CONDITIONS | DISPLAY THAT PAPER FEED CASSETTE IS BEING OPEN AND MACHINE CONDITIONS | DISPLAY THAT SIDE DOOR IS BEING OPEN AND MACHINE CONDITIONS | DISPLAY THAT DOOR IS BEING OPEN AND MACHINE CONDITIONS | DISPLAY THAT DOOR IS BEING OPEN AND MACHINE CONDITIONS |
| | NORMAL TIME | | DISPLAY THAT FRONT DOOR IS BEING OPEN AND MACHINE CONDITIONS | DISPLAY THAT PAPER FEED CASSETTE IS BEING OPEN AND MACHINE CONDITIONS | DISPLAY THAT SIDE DOOR IS BEING OPEN AND MACHINE CONDITIONS | DISPLAY THAT DOOR IS BEING OPEN AND MACHINE CONDITIONS | DISPLAY THAT DOOR IS BEING OPEN AND MACHINE CONDITIONS |

BAD CONDITIONS 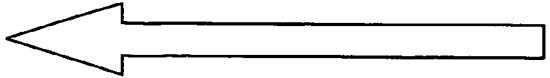

FIG.19

| ORIENTATION / AREA | DIAGONALLY FORWARD RIGHT | FRONT SIDE | DIAGONALLY FORWARD LEFT |
|---|---|---|---|
| FORWARD | RIGHT PERSPECTIVE OF FORWARD SIDE | FORWARD FRONT SIDE | LEFT PERSPECTIVE OF FORWARD SIDE |
| RIGHT SIDE SURFACE | RIGHT PERSPECTIVE OF RIGHT SIDE SURFACE | RIGHT SIDE SURFACE | LEFT PERSPECTIVE OF RIGHT SIDE SURFACE |
| REAR SIDE | RIGHT PERSPECTIVE OF REAR SIDE | FRONT SIDE OF REAR | LEFT PERSPECTIVE OF REAR SIDE |
| LEFT SIDE SURFACE | RIGHT PERSPECTIVE VIEW OF LEFT SIDE SURFACE | LEFT SIDE SURFACE | LEFT PERSPECTIVE VIEW OF LEFT SIDE SURFACE |
| TOP | TOP SIDE | TOP SIDE | TOP SIDE |
| FAR | PERSPECTIVE VIEW VIEWING WHOLE | PERSPECTIVE VIEW VIEWING WHOLE | PERSPECTIVE VIEW VIEWING WHOLE |

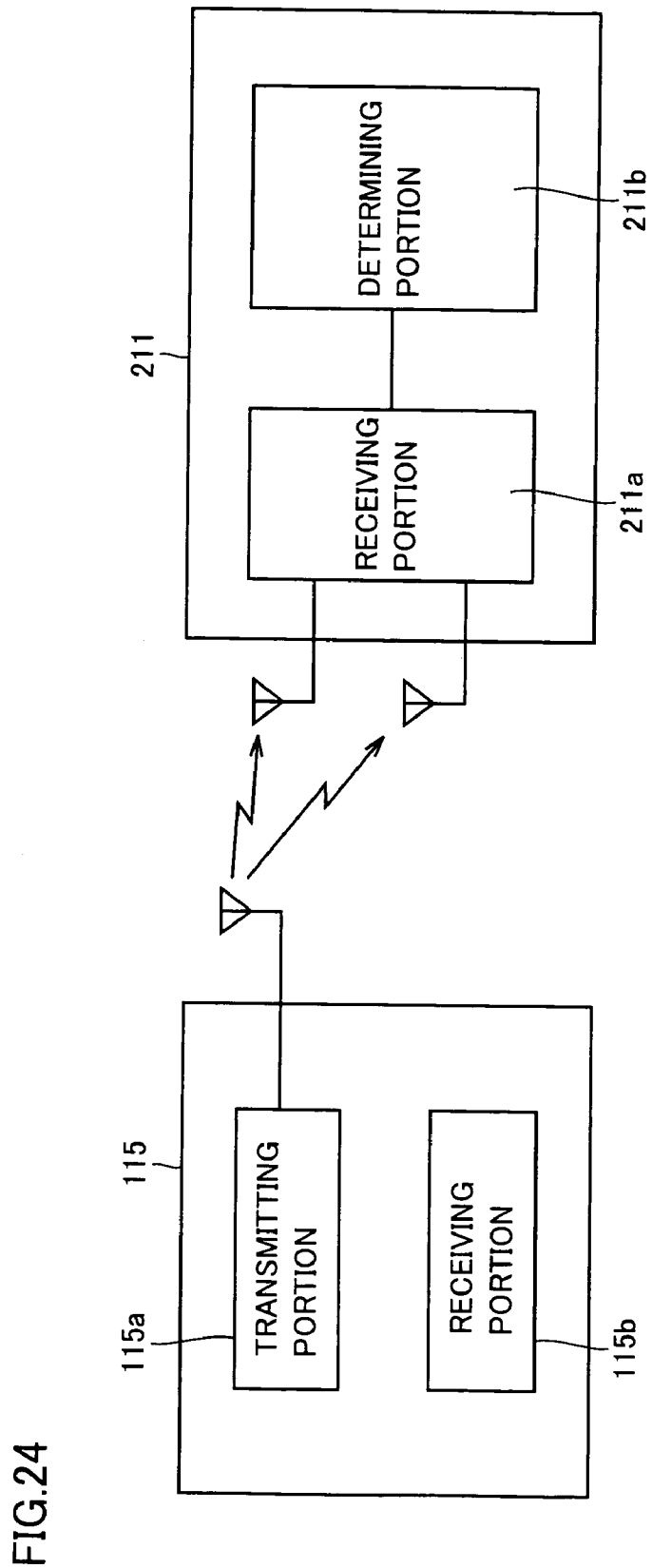

IMAGE FORMING APPARATUS FOR DISPLAYING INFORMATION ON DISPLAY UNIT REMOVABLE FROM APPARATUS MAIN BODY

This application is based on Japanese Patent Application No. 2006-225449 filed with the Japan Patent Office on Aug. 22, 2006, the entire content of which is hereby incorporated by reference.

BACKGROUND OF THE INVENTION

1. Field of the Invention

The present invention relates to an image forming apparatus and a method of controlling the image forming apparatus, and more particularly to an image forming apparatus for displaying information on a display unit that is removable from an apparatus main body and a method of controlling the image forming apparatus.

2. Description of the Related Art

Conventionally, image forming apparatuses such as MFPs (Multi Function Peripherals), copiers, and printers have been known.

Japanese Laid-Open Patent Publication No. 08-039894 (Patent Document 1) discloses an image forming apparatus that allows a display unit to be removed therefrom or allows the angle of a display screen to be changed so that, upon handling a jam or the like, action can be easily taken while viewing the display unit, which in turn does not require cumbersome actions such as standing up and crouching down.

Japanese Laid-Open Patent Publication No. 2004-302307 (Patent Document 2) discloses an image forming apparatus in which, when a detachable panel is placed at the rear of an MFP, a panel for a service person is depicted.

Japanese Laid-Open Patent Publication No. 08-146688 (Patent Document 3) discloses an image forming apparatus including an operating unit whose placement location can be changed.

Japanese Laid-Open Patent Publication No. 02-147545 (Patent Document 4) discloses a technique for providing a jam location display apparatus inside an apparatus in order to display a jam location in a paper transporting portion of a copier or the like. First display in a rough display manner and second display in a detailed display manner are provided.

Japanese Laid-Open Patent Publication No. 09-134049 (Patent Document 5) discloses that in addition to an LCD display apparatus provided at the top of a main body, a second LCD display apparatus is installed inside the apparatus main body so that, upon performing maintenance, work can be performed referring to the second LCD display apparatus.

In the techniques of Patent Documents 1 and 3 a displaying portion can be moved to some locations in an apparatus main body, and in the technique of Patent Document 2 the mounting location of a displaying portion is moved and thereby displayed content can be changed. This improves visibility. However, since in any of the techniques a display apparatus needs to be viewed in a state in which the display apparatus is mounted on an apparatus main body, upon performing maintenance, jam handling, or the like, in the vicinity of the apparatus, display cannot be checked at any free location and thus it cannot be said that operability is satisfactory.

According to the Patent Documents 4 and 5, a plurality of displaying portions are provided and allowed to display independently, whereby visibility can be enhanced. However, since the displaying portions are fixed to an apparatus main body, upon performing maintenance, jam handling, or the like, in the vicinity of the apparatus, display cannot be checked at any free location and thus it cannot be said that operability is satisfactory.

SUMMARY OF THE INVENTION

An object of the present invention is therefore to provide an image forming apparatus capable of improving user operability and a method of controlling the image forming apparatus.

To attain the above-described object, according to one aspect of the present invention, an image forming apparatus includes: a transmitting portion that transmits information from an apparatus main body to a removable display unit; a detecting portion that detects a positional relationship between the display unit being removed and the apparatus main body; and a controlling portion that determines a content to be displayed on the display unit, based on a detection result obtained by the detecting portion and controls the content to be displayed on the display unit using the transmitting portion.

According to another aspect of the present invention, a method of controlling an image forming apparatus including a transmitting portion that transmits information from an apparatus main body to a removable display unit, the method including the steps of: detecting a positional relationship between the display unit being removed from the apparatus main body and the apparatus main body; and determining content to be displayed on the display unit, based on a detection result obtained in the detecting step and controlling the content to be displayed on the display unit using the transmitting portion.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 15 to 18 are diagrams showing exemplary control tables.

FIG. 19 is a diagram showing a table for determining a picture of the image forming apparatus to be displayed based on the location and direction of the detachable display.

FIG. 24 is a diagram for describing a mechanism for detecting a direction of the detachable display.

DESCRIPTION OF THE PREFERRED EMBODIMENTS

Figure 1:
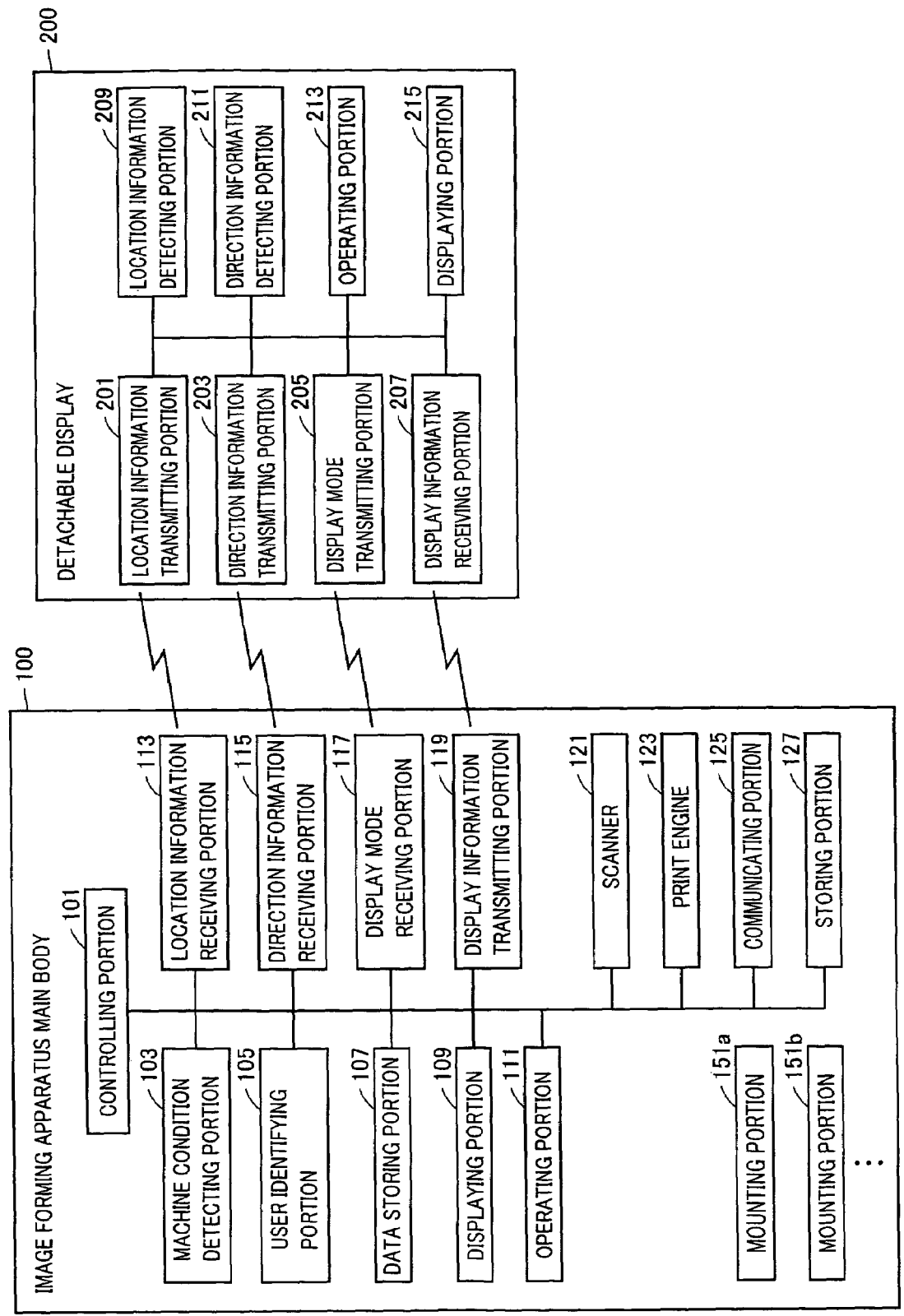
FIG. 1 is a block diagram showing an overall configuration of an image forming apparatus according to one embodiment of the present invention.

Referring to the drawings, an image forming apparatus according to one embodiment of the present invention will be described below. In the image forming apparatus which is a copier or the like, a display unit of an operating portion is configured to be detachable from an apparatus main body.

As shown in FIG. 1, an image forming apparatus main body 100 has a location information receiving portion 113 serving as a communication apparatus that performs communication with a detachable display 200, a direction information receiving portion 115, a display mode receiving portion 117, and a display information transmitting portion 119. The display information transmitting portion 119 transmits optimal displayed content to detachable display 200.

In addition, image forming apparatus main body 100 includes a machine condition detecting portion 103 that detects machine conditions; a user identifying portion 105 that identifies a user by a display mode or the like received from detachable display 200; a controlling portion 101 that controls displayed content based on data received from detachable display 200, machine conditions detected by image forming apparatus main body 100, user type data, and the like; and a data storing portion 107 that stores received data and controlled data.

Image forming apparatus main body 100 includes an operating portion 111 that accepts an operation from a user; and a displaying portion 109 that provides display of information to a user. Furthermore, image forming apparatus main body 100 includes mounting portions 151a, 151b . . . for mounting detachable display 200.

Image forming apparatus main body 100 further includes members relating to image formation and image reading/storage, such as a scanner 121, a print engine 123, a communicating portion 125, and a storing portion 127.

Detachable display 200 includes a location information detecting portion 209 that detects a location of the display; a direction information detecting portion 211 that detects a tilt and an orientation; an operating portion 213 to be operated when a service engineer or the like performs a specific operation; a displaying portion 215; a location information transmitting portion 201 that transmits detected location information, tilt information, display mode to image forming apparatus main body 100; a direction information transmitting portion 203; a display mode transmitting portion 205; and a display information receiving portion 207 that receives display information to be transmitted from image forming apparatus main body 100.

Figure 2:
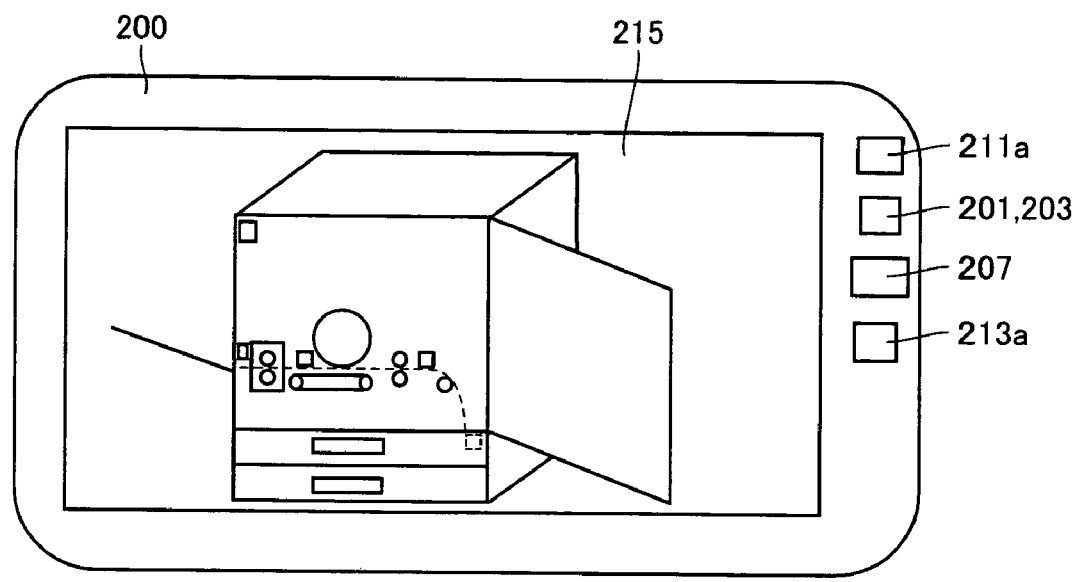
FIG. 2 is a diagram showing an external appearance of a detachable display 200.

FIG. 2 is a diagram showing an external appearance of detachable display 200.

Referring to the drawing, detachable display 200 has location information detecting portion 209 for detecting a positional relationship between image forming apparatus main body 100 and detachable display 200, and a tilt sensor 211a that detects a direction (orientation and tilt) of detachable display 200. Furthermore, detachable display 200 includes location/direction (tilt) information transmitting portions 201 and 203 that transmit tilt information detected by tilt sensor 211a and location information detected by location information detecting portion 209, to image forming apparatus main body 100.

In addition, detachable display 200 includes a key 213a used to perform a specific operation (mode display) by a service engineer for maintenance or the like; display mode transmitting portion 205 (FIG. 1) that transmits a mode currently being displayed; display information receiving portion 207 that receives display information to be transmitted from image forming apparatus main body 100; and displaying portion 215 that displays the information received by display information receiving portion 207.

Figure 3:
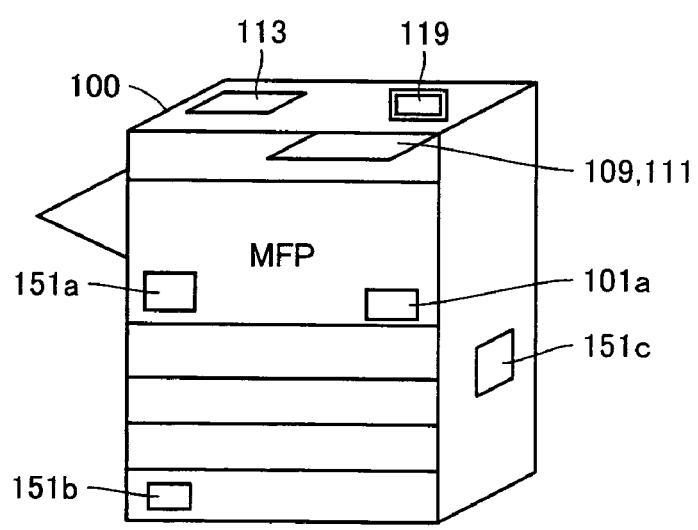
FIG. 3 is a diagram showing an internal structure of an image forming apparatus 100.

FIG. 3 is a diagram showing an internal structure (a portion for communicating with the detachable display) of image forming apparatus 100.

Image forming apparatus 100 includes location information receiving portion 113 that receives location information to be transmitted from detachable display 200; and a display information controlling portion 101a that controls content to be displayed on detachable display 200, taking into consideration a location/direction between image forming apparatus main body 100 and detachable display 200 and conditions of image forming apparatus main body 100. Furthermore, image forming apparatus 100 includes display information transmitting portion 119 that transmits display information determined by display information controlling portion 101a, to detachable display 200. Image forming apparatus main body 100 also includes an operating panel (composed of displaying portion 109 and operating portion 111).

In addition, image forming apparatus main body 100 includes mounting portions 151a, 151b . . . for mounting detachable display 200.

Figure 4:
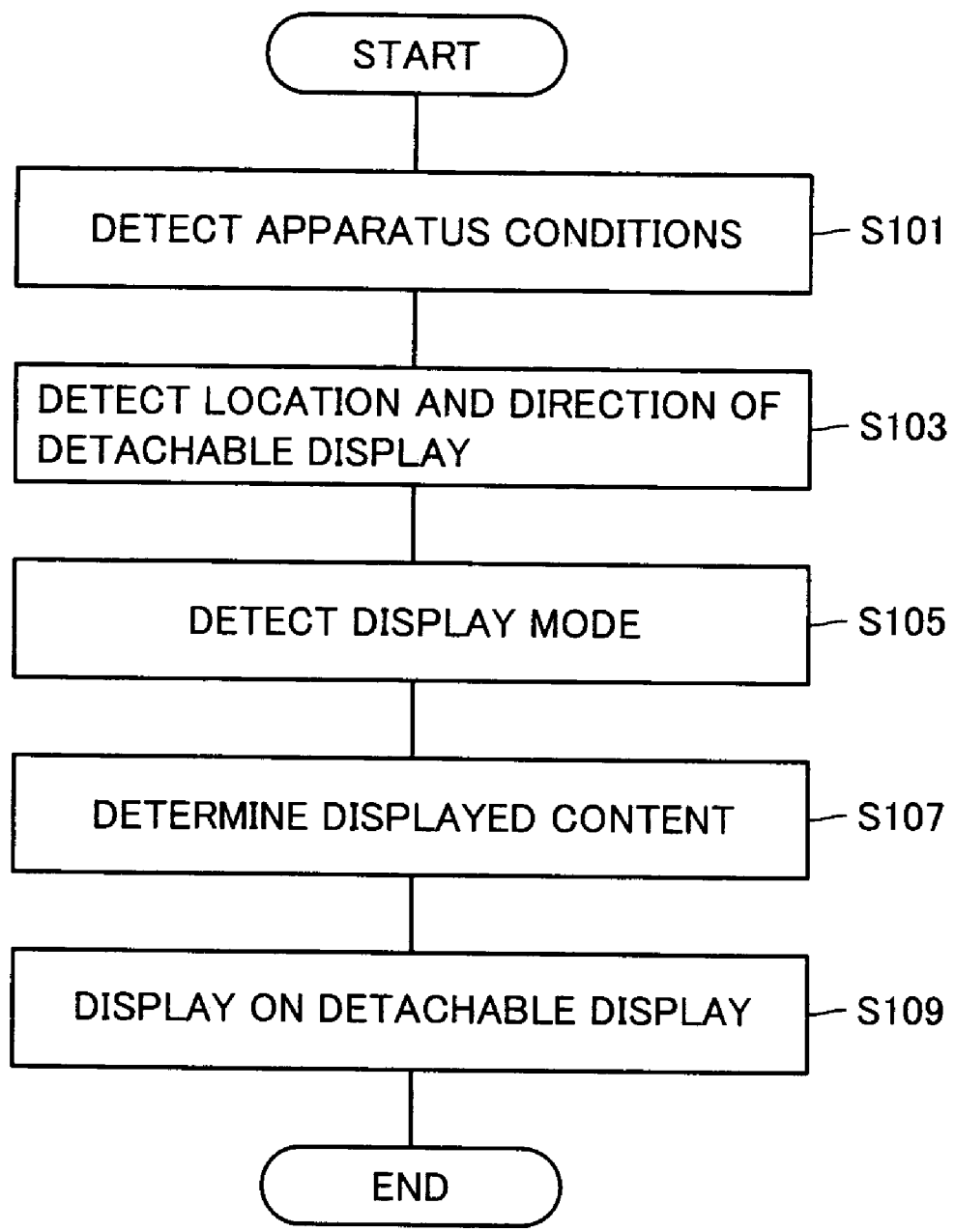
FIG. 4 is a flowchart showing a process performed by the image forming apparatus.

FIG. 4 is a flowchart showing a process performed by the image forming apparatus.

Referring to the drawing, in step S101, conditions (occurrence of error or trouble, operating conditions, etc.) of the image forming apparatus are detected. In step S103, the location and direction (tilt) of detachable display 200 are detected. In step S105, a display mode, whether it is in a normal mode or maintenance mode, for example, is detected.

In step S107, based on detection results obtained in steps S101 to S105, content to be displayed on detachable display 200 is determined. Thereafter, in step S109, display information is transmitted to detachable display 200, whereby detachable display 200 provides display.

Figure 5:
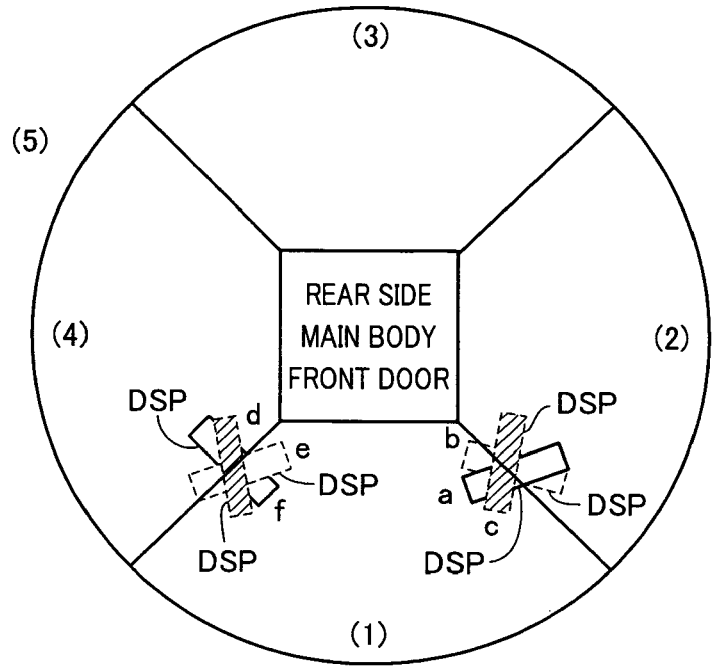
FIGS. 5 and 6 are diagrams showing exemplary detection of a location of detachable display 200.
Figure 6:
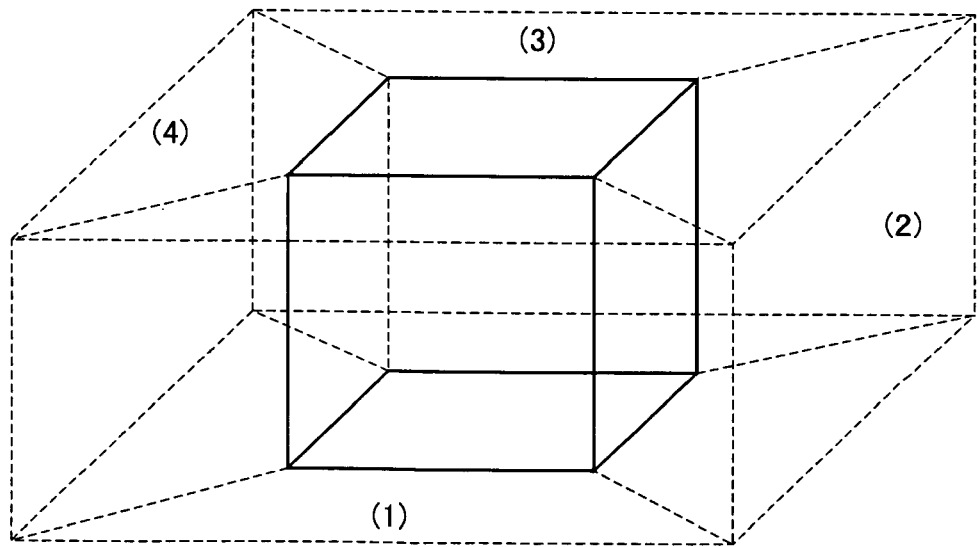

FIGS. 5 and 6 are diagrams showing exemplary detection of the location and direction of detachable display 200. FIG. 5 is a diagram of the image forming apparatus main body and its periphery as viewed from above, and FIG. 6 is a diagram of an upper half of the image forming apparatus main body as viewed from an angle.

In the drawings, a determination is made as to at which location in which area detachable display 200 is located among (1) an area within a predetermined distance from a forward front door of the image forming apparatus main body at the center, (2) an area within the predetermined distance from a right side surface, (3) an area within the predetermined distance from the rear side, (4) an area within the predetermined distance from a left side surface, and (5) an area outside of the predetermined distance. Each boundary is a line extending in a direction of 45 degrees from a corner of the machine. The aforementioned predetermined distance is one meter from a circumference of the image forming apparatus. If exceeding this, it is recognized that detachable display 200 is at a location far from the main body and thus the detachable display 200 is determined to be in the area (5).

As also shown in FIG. 6, a periphery of the upper half of the image forming apparatus main body is divided into the areas (1) to (4). A periphery of a lower half of the image forming apparatus main body is similarly divided into the areas (1) to (4). In addition, an area at the top of the main body may also be considered. That is, when the display is mounted on or held over the area at the top of the main body, the display may display for the top, or only when the display is mounted on or held over space immediately above the main body, display for the top may be provided.

When the display is present around a boundary between areas, a direction (orientation and tilt) of the display is detected. For example, the cases of a to c and d to f are detected. A surface denoted by DSP is a display surface. When the display is held over at/in the locations and orientations of a, b, e, and f in FIG. 5, it is determined that the display is present in the area (1) (front door area). When in the orientation of c and d, it is determined that the display is present in the areas (2) and (4) (right and left side surfaces), respectively.

Now, display will be described that is provided when, while copy printing is performed by the image forming apparatus main body, paper fed from a paper feed cassette has jammed in a fusing portion and a paper feeding portion and a general user handles the jam.

Figure 7:
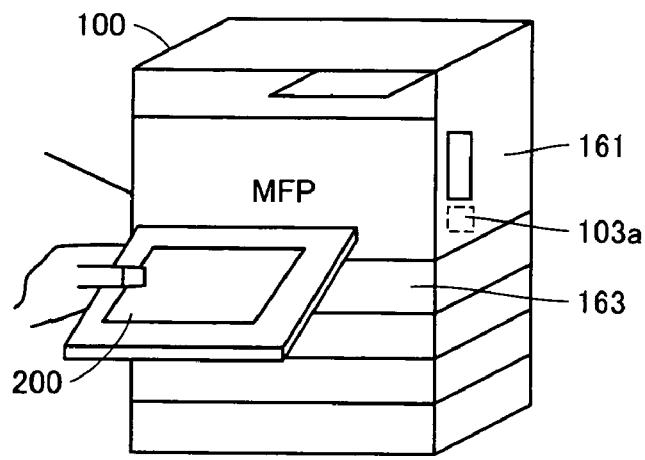
FIG. 7 is a diagram showing a state in which a user holds detachable display 200 in his/her hand over image forming apparatus main body 100.

FIG. 7 is a diagram showing a state in which the user holds detachable display 200 in his/her hand over image forming apparatus main body 100. In the drawing, reference numeral 161 denotes a side door and reference numeral 163 denotes a paper feed cassette.

When a jam has occurred, display informing of the occurrence of a jam is provided on the display of displaying portion 109 (FIG. 1) of image forming apparatus main body 100. When the user sees the display, opens the front door, and holds detachable display 200 in his/her hand over the location a in FIG. 5 (the upper half of the main body), for example, an orientation and a tilt are detected by direction sensor 211a in FIG. 2. In addition, a location of detachable display 200 is detected by location information detecting portion 209. By location information/tilt information transmitting portions 201 and 203, information is transmitted to image forming apparatus main body 100.

In image forming apparatus main body 100, location information/direction information receiving portions 113 and 115 receive the location information and the direction information and then transmit the information to display information controlling portion 101a. Display information controlling portion 101a determines optimal information, taking into consideration the received direction information and location information and conditions (here, a jam is being occurred) of the image forming apparatus, and then display information is transmitted by display information transmitting portion 119 to detachable display 200. Note that here the "optimal information" includes a diagram of the main body as viewed from the location of detachable display 200 and information for instructing the user to clear the jam.

In detachable display 200, the optimal information is received by display information receiving portion 207 and then displayed on displaying portion 215.

Figure 8:
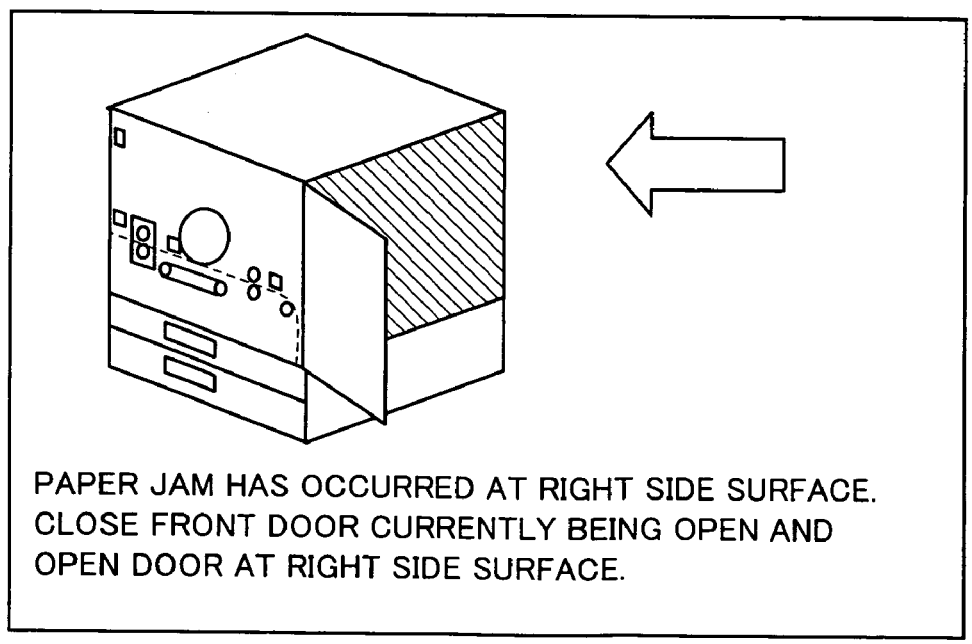
FIGS. 8 to 14 are diagrams showing exemplary display on detachable display 200.

FIG. 8 is a diagram showing exemplary display on detachable display 200.

Here, there is shown exemplary display in a state in which a general user uses the display, a fusing/paper feed jam has occurred, the detachable display is held over the image forming apparatus main body from the top of the front door diagonally forward right, and the front door of the image forming apparatus is open.

Displayed content here includes a picture of the front door viewed from diagonally forward right, with the upper half of image forming apparatus main body 100 being centered (close-up). By seeing the displayed content, the user can know the location where the jam has occurred and a handling method therefor (method of opening and closing doors).

When, by seeing the display, the user opens a side door at the right side surface and brings detachable display 200 near within the side door, the content displayed on detachable display 200 is changed. Specifically, the image forming apparatus main body 100 detects by a side door open/close detecting apparatus 103a (FIG. 7) that the side door has been opened, displays, taking into consideration a jam state, an image showing a state in which the side door is open, on the displaying portion of detachable display 200, and instructs, for example, to open a cover of the fusing portion. By repeating this, the user can smoothly handle the jam.

Figure 9:
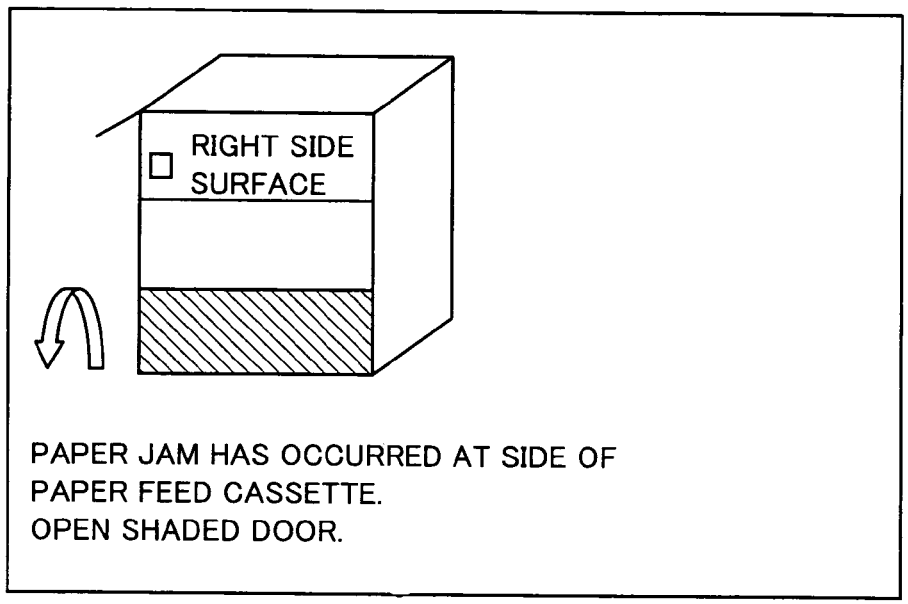

For example, when a general user holds detachable display 200 over the location c in FIG. 5 (the lower half of the main body), display (close-up display of the lower half) such as that shown in FIG. 9 is provided.

Here, there is shown exemplary display in a state in which the general user uses the display, a fusing/paper feed jam has occurred, the detachable display is held over the image forming apparatus at a forward lower side of the right side door, and the doors of the image forming apparatus are closed.

Figure 10:
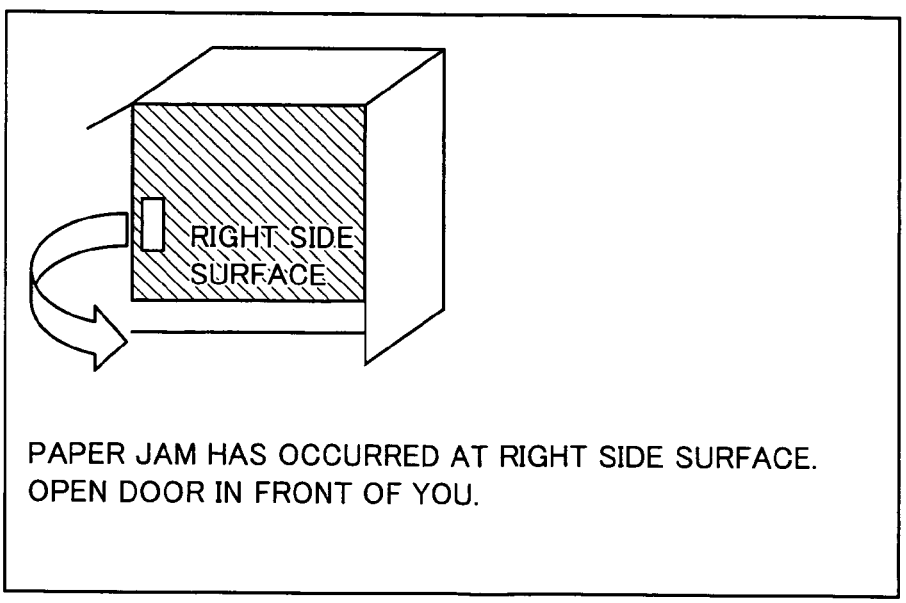

Similarly, when a general user holds detachable display 200 over image forming apparatus main body 100 (in a state in which the door is closed) near a forward side of the right side door (the upper half of the main body), display such as that shown in FIG. 10 is provided. When a general user holds detachable display 200 over image forming apparatus main body 100 at the front side of the front door (the upper half of the main body) in a state in which the front door is open, displayed content such as that shown in FIG. 11 is provided.

Figure 11:
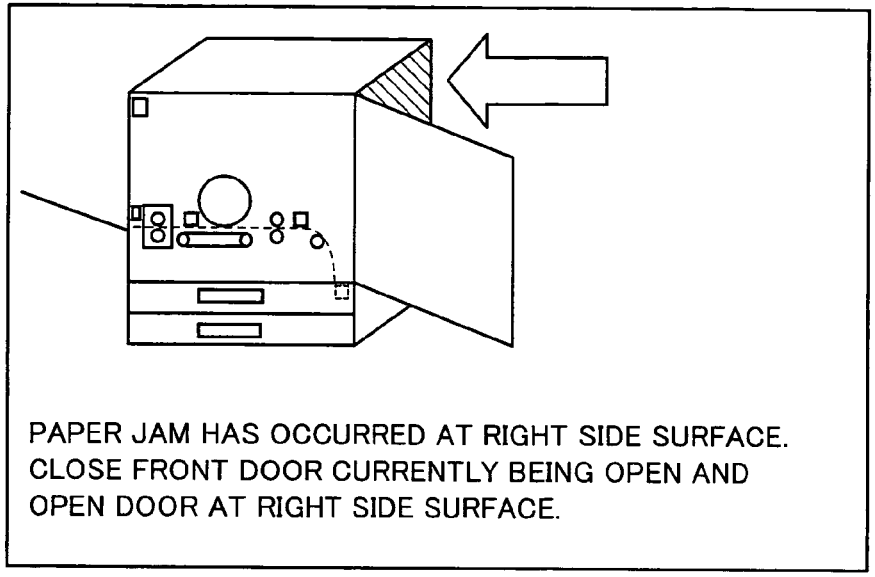
Figure 12:
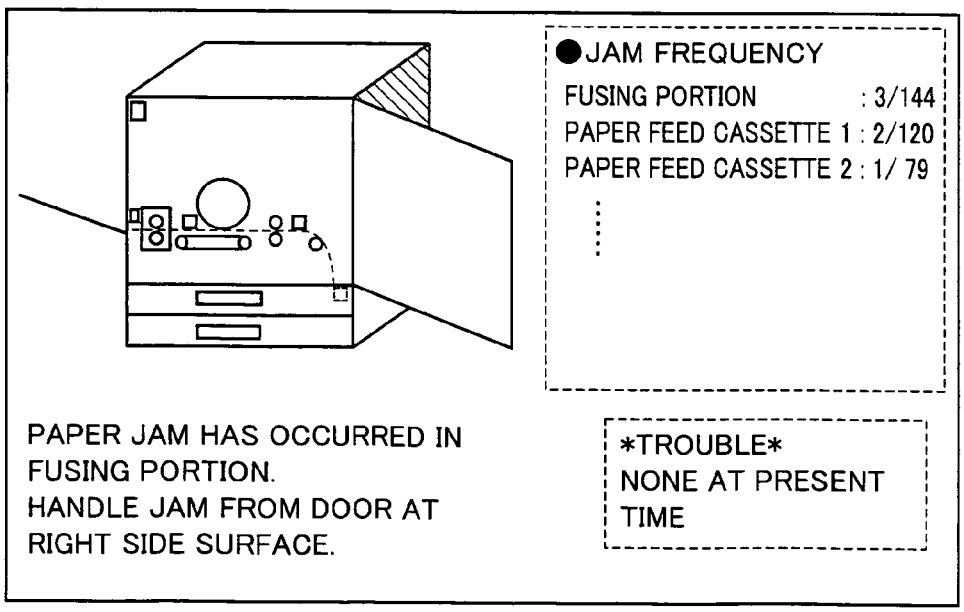

When, at/in the same location and conditions as those in FIG. 11, a service engineer opens the front door and holds the detachable display over a forward side of the front door, displayed content such as that shown in FIG. 12 is provided.

Here, as compared with the general user, a detailed description of trouble is provided.

Since the service engineer can understand the nature of jams and the like, even by a simple description, the same description as that for the general user (e.g., an elaborate step-by-step description such as "open the door") is not always necessary to be provided and a simple description such as "fusing jam has occurred" or "paper feed jam has occurred in the second tray" may be provided. Of course, an elaborate description may be provided.

It may be considered that the service engineer sees the jam occurrence rate and trouble occurrence rate of each portion and a counter value, for reference to malfunctions of components and uses them as guidelines for suggestions for replacing the components, or the like. Thus, together with the current jam occurrence information and a description of a handling operation, there are displayed jam frequency, trouble history information, a representative counter value, and the presence or absence of occurrence of trouble at the present time. Content (categories) to be displayed may be changeable by a specific operation by the service engineer.

The jam frequency in FIG. 12 is expressed as a fraction; counting starts at the time when the machine is installed (or when the counter value is cleared) and the number of operations performed is set as the denominator (e.g., the number of times paper has been fed from a paper feed cassette 1 is 120) and the number of times, among the operations, paper fails to be fed through is set as the numerator (the number of paper feed jams in the paper feed cassette 1 is 2).

Figure 13:
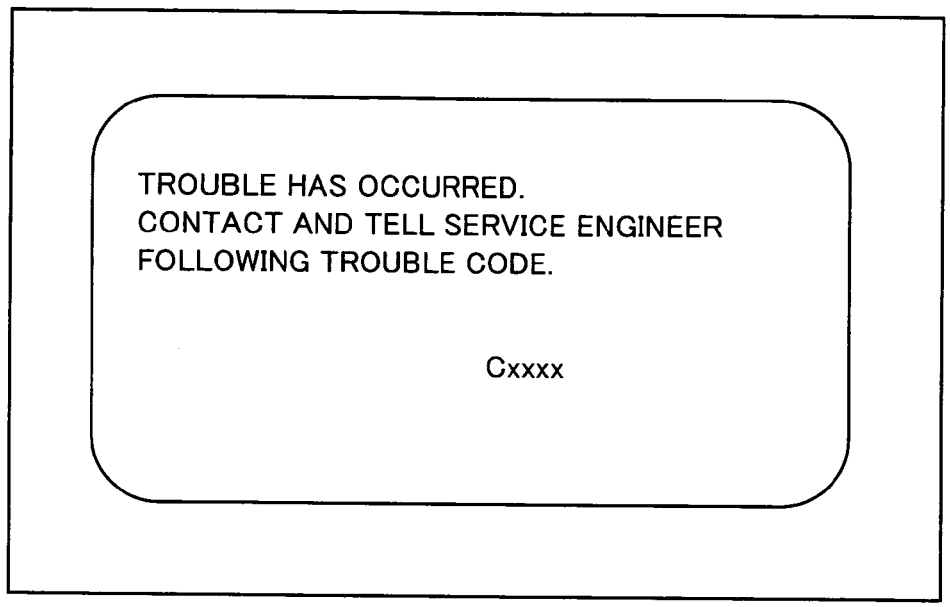
Figure 14:
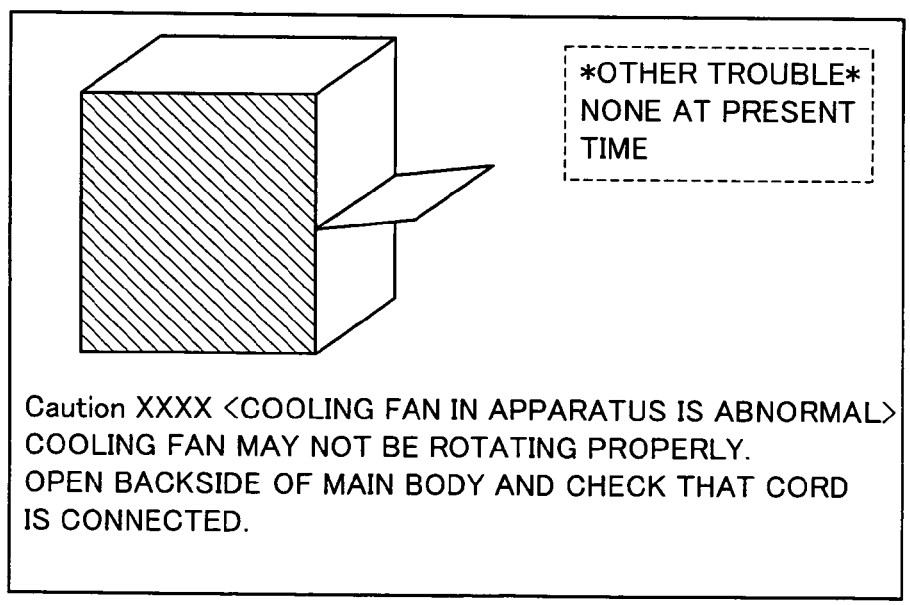

When a jam and machine trouble have occurred at the same time and the detachable display is mounted on the rear side of the main body (or when the detachable display is held over the rear side), if the user who uses the detachable display is a general user, displayed content shown in FIG. 13 is provided and if the user who uses the detachable display is a service engineer, displayed content such as that shown in FIG. 14 is provided. In a jam and machine trouble, the machine trouble is more serious in terms of the conditions of the main body and thus jam information is not displayed. As such, depending on the degree of seriousness of the conditions, displayed content is determined.

As described above, detachable display 200 has different displayed content with different machine conditions, different types of user who uses the detachable display, and different locations and directions of the detachable display.

Image forming apparatus main body 100 controls displayed content based on location information, direction information, and display mode information from detachable display 200 and machine condition information detected by the main body, which is performed according to tables shown in FIGS. 15 to 18.

FIGS. 15 to 18 are diagrams showing exemplary control tables.

Figure 15:
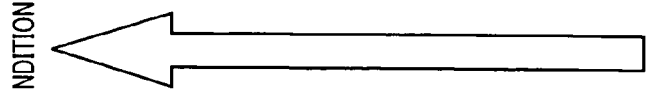

FIG. 15 is a diagram showing displayed content provided when a general user operates detachable display 200 in a state in which a door (and/or a cassette) is/are closed.

Displayed content is described according to the location of detachable display 200, for each case of normal time, occurrence of attention, occurrence of a jam (in each of a paper feed slot, a fusing portion, and a paper ejecting portion), and occurrence of trouble.

Figure 16:
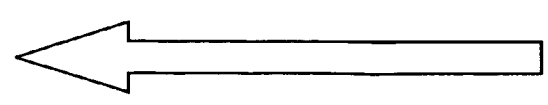

Similarly, FIG. 16 is a diagram showing displayed content provided when a service engineer operates detachable display 200 in a state in which a door (and/or a cassette) is/are closed. FIG. 17 is a diagram showing displayed content provided when the general user operates detachable display 200 in a state in which a door (and/or a cassette) is/are open. FIG. 18 is a diagram showing displayed content provided when the service engineer operates detachable display 200 in a state in which a door (and/or a cassette) is/are open.

As described in FIGS. 13 and 14 too, an event that is serious (event of bad conditions) in terms of machine conditions is displayed on a higher priority basis. In FIGS. 15 to 18, the higher the event listed, the higher the degree of seriousness. When an event described in the lower part and an event described in the upper part have occurred concurrently, the upper event is displayed.

FIG. 19 is a diagram showing a table for determining a picture of the image forming apparatus to be displayed based on the location (area) and direction of the detachable display.

As shown in the drawing, a picture of the image forming apparatus to be displayed is determined based on the area and direction. Here, for the area in which the detachable display is located, a distinction is made between forward, right side surface, rear side, left side surface, top, and far (the areas (1), (2), (3), (4), and (5) in FIG. 5, respectively), and for the orientation of the detachable display, a distinction is made between three items, diagonally forward right, front side, and diagonally forward left. In addition, for the tilt, a distinction is made between upward and downward directions, and based on that, different display may be provided.

Figure 20:
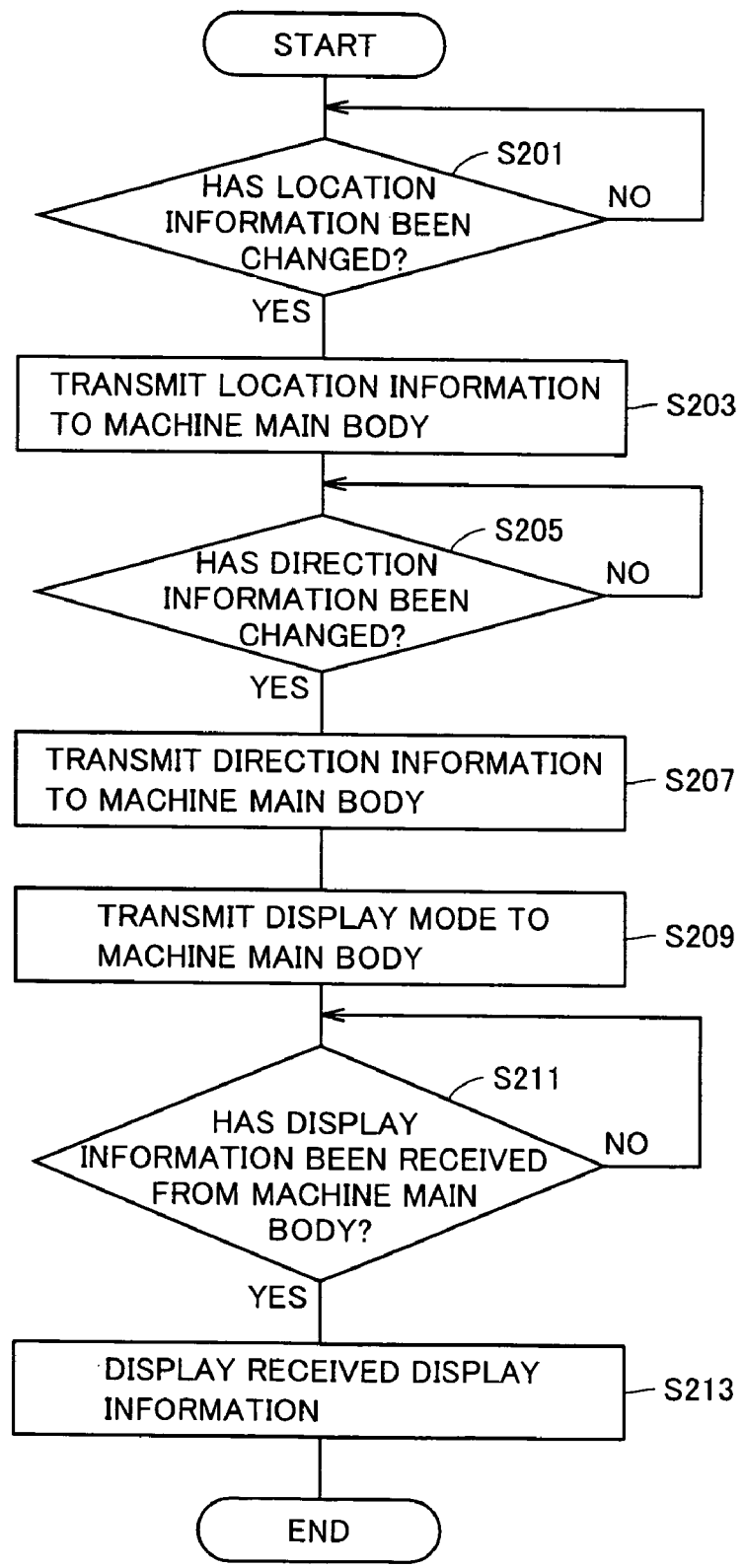
FIG. 20 is a flowchart showing an internal process of detachable display 200.

FIG. 20 is a flowchart showing an internal process of detachable display 200.

Referring to the drawing, in step S201, a determination is made as to whether location information has been changed by movement of the detachable display. If YES, then, in step S203 the location information is transmitted to the image forming apparatus main body.

In step S205, a determination is made as to whether direction information has been changed by change in the tilt of the detachable display. If YES, then, in step S207 the direction information is transmitted to the image forming apparatus main body.

In step S209, a display mode (whether the detachable display is used by a general user or a service engineer, for example) is transmitted to the image forming apparatus main body.

In step S211, a determination is made as to whether display information has been received from the image forming apparatus main body. If YES, then, in step S213, the received information is displayed on displaying portion 215.

By such a process, when location information/tilt information are changed by detachable display 200 being held in user's hand, for example, the location information/tilt information are transmitted to the main body. In addition, a display mode is detected and information is transmitted to the main body.

Figure 21:
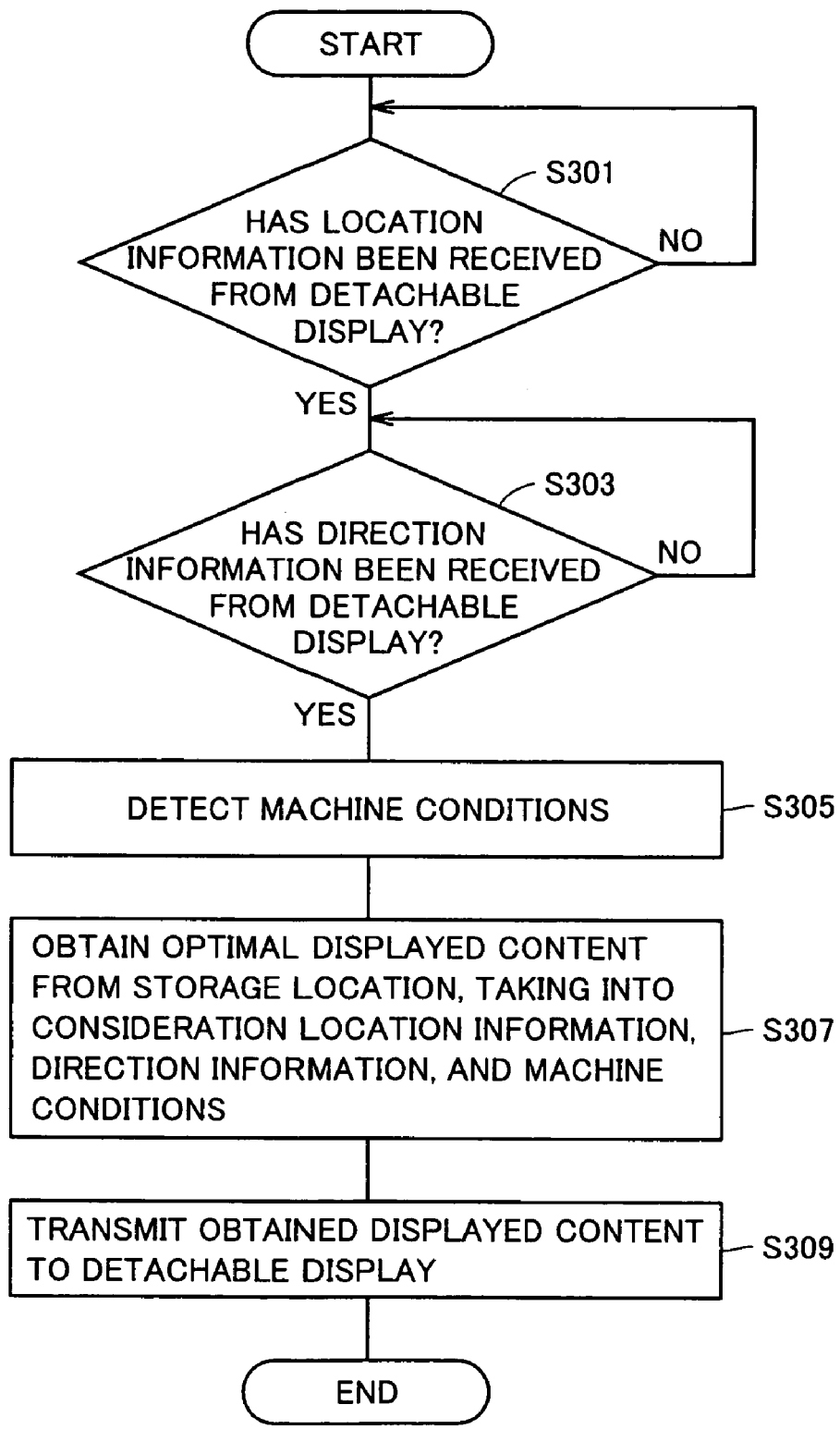
FIG. 21 is a flowchart showing an internal process of image forming apparatus main body 100.

FIG. 21 is a flowchart showing an internal process of image forming apparatus main body 100.

Here, only a process for communicating with detachable display 200 is provided. Referring to the drawing, in steps S301 and S303, when location information and tilt information are transmitted from detachable display 200, the image forming apparatus main body side receives the information. In step S305 machine conditions (and a display mode) are detected, and in step S307 optimal information that takes into consideration the information from the detachable display is obtained from data storing portion 107. In step S309, display information is transmitted to the detachable display. When detachable display 200 receives the display information from image forming apparatus main body 100, detachable display 200 displays content thereof on the displaying portion.

(Methods of Detecting a Location and a Direction)

Figure 22:
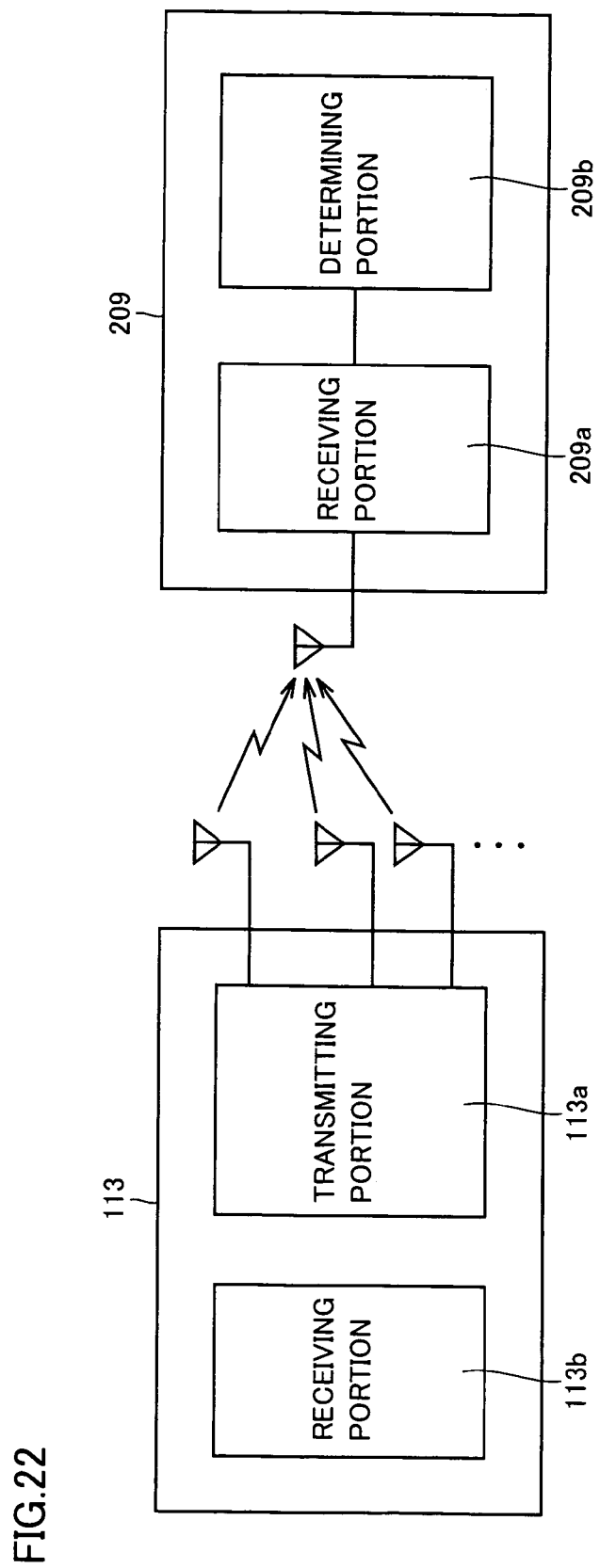
FIG. 22 is a diagram for describing a first mechanism for detecting a location of the detachable display.

FIG. 22 is a diagram for describing a first mechanism for detecting a location of the detachable display.

As shown in the drawing, a transmitting portion 113*a* having a plurality of antennas and a receiving portion 113*b* are provided to location information receiving portion 113 of the image forming apparatus main body. The plurality of antennas are installed with a predetermined interval provided therebetween. For example, the antennas are installed on the front side, plurality of side surfaces, and top side of the image forming apparatus main body. Location information detecting portion 209 of the detachable display includes a receiving portion 209*a* and a determining portion 209*b*. Receiving portion 209*a* receives radio waves from the plurality of antennas of the image forming apparatus main body. Determining portion 209*b* determines a location of the detachable display by the strengths of the received radio waves.

Figure 23:
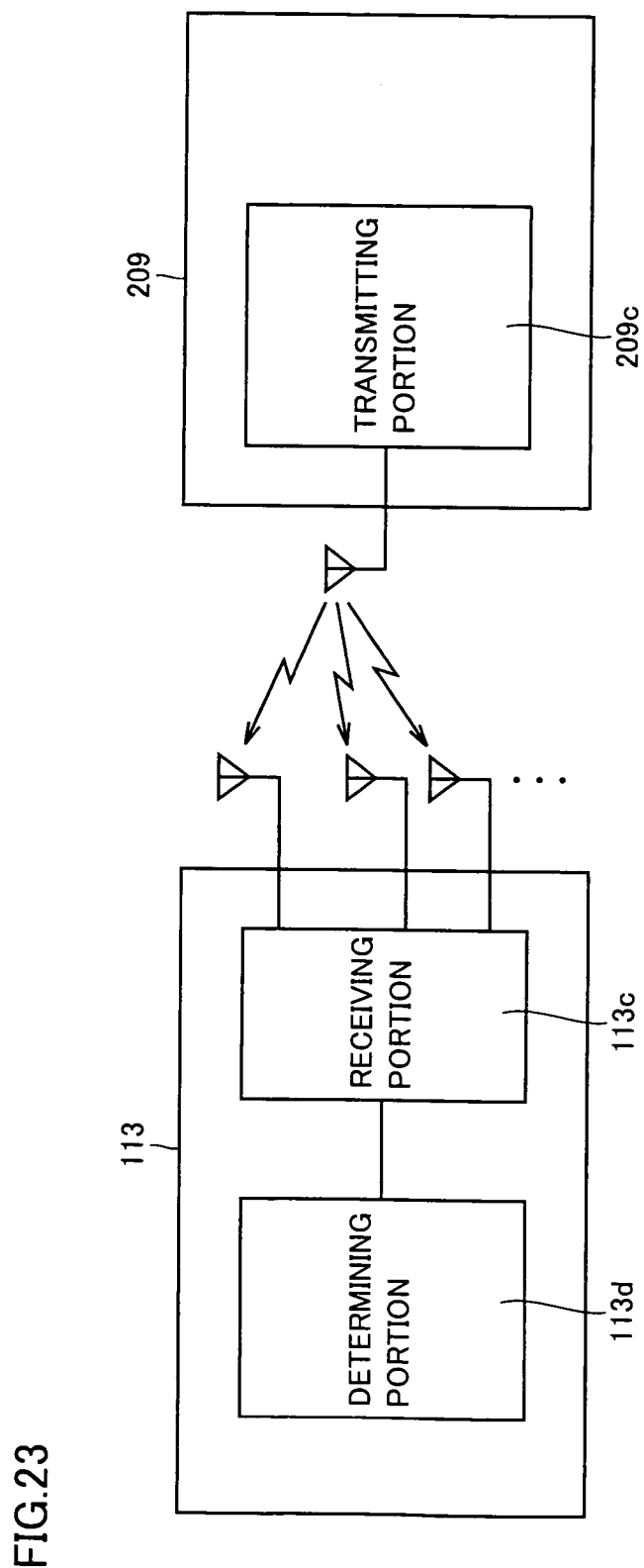
FIG. 23 is a diagram for describing a second mechanism for detecting a location of the detachable display.

FIG. 23 is a diagram for describing a second mechanism for detecting a location of the detachable display.

In this example, a receiving portion 113*c* having a plurality of antennas and a determining portion 113*d* are provided to location information receiving portion 113 of the image forming apparatus main body. The plurality of antennas are installed with a predetermined interval provided therebetween. For example, the antennas are installed on the front side, plurality of side surfaces, and top side of the image forming apparatus main body. Location information detecting portion 209 of the detachable display includes a transmitting portion 209*c*. Receiving portion 113*c* receives radio waves from the plurality of antennas of the image forming apparatus main body. Determining portion 113*d* detects phase shifts of signals (or strengths of the radio waves)

received by the plurality of antennas and thereby determines a location of the detachable display.

FIG. 24 is a diagram for describing a mechanism for detecting a direction (orientation and tilt) of the detachable display.

In this example, a receiving portion 211a having a plurality of antennas and a determining portion 211b are provided to direction information receiving portion 211 of the detachable display. The plurality of antennas are installed with a predetermined interval provided therebetween. Direction information receiving portion 115 of image forming apparatus main body 100 includes a transmitting portion 115a and a receiving portion 115b. Direction information detecting portion 211 of the detachable display receives a radio wave from an antenna of the image forming apparatus main body. Determining portion 211b detects phase shifts of signals received by the plurality of antennas and thereby determines a direction of the detachable display.

It is also possible that a sensor such as an acceleration sensor may be provided to the detachable display and the direction may be detected based on an output from the sensor.

In order to detect a location of the detachable display, it is also possible that a plurality of location detection transmitters may be provided to the detachable display, radio waves may be outputted from the transmitters, and the image forming apparatus main body that includes a radio wave receiver may receive the radio waves. The image forming apparatus detects the location and direction of the detachable display by the strengths of the received radio waves.

Alternatively, when the detachable display is mounted on the image forming apparatus main body, only a mounting location may be detected and a tilt (direction) may not be detected.

Furthermore, by providing a GPS mechanism to the detachable display, the location may be detected. Alternatively, a location at which a person holding the detachable display stands may be detected by an infrared sensor or the like, and thereby a location of the detachable display may be detected.

Although, in the present embodiment, the image forming apparatus main body includes two displays, a permanent operating panel (display) and a detachable display, it is also possible to provide an image forming apparatus that includes only a detachable display without including an operating panel in a main body.

User identifying portion 105 may be included in the image forming apparatus main body or user identification may be performed by detachable display 200. Alternatively, a system may be used in which the image forming apparatus is connected to a server and the server performs user identification.

Although, in the present embodiment, only an event that has a high degree of seriousness of machine conditions is displayed on the display, a plurality of information may be displayed in alignment.

Furthermore, when the backside of detachable display 200 is not orientated toward a direction of the image forming apparatus main body, nothing may be displayed or the same display as that for the area (5) in FIG. 5 may be provided.

Although in FIG. 5 a boundary between areas is a straight line having a tilt of 45 degrees from a straight line composing a perimeter of the machine and an area range covers a distance of one meter from the image forming apparatus main body, other specifications may be employed.

EFFECTS IN THE EMBODIMENT

As described above, according to the present embodiment, advantageous effects are provided that a user does not need to perform cumbersome actions and only by carrying a detachable display and moving, the user can obtain accurate information according to a place where work is performed and thus can smoothly perform work. Specifically, by holding a removed panel having a receiving portion and a displaying portion over near an image forming apparatus, optimal information that is determined based on that location/direction and machine conditions can be obtained.

This makes it possible to provide an image forming apparatus including a displaying portion with which operators, such as a general user and a service person, can easily work, and a display apparatus.

According to the invention, a positional relationship between the display unit and the apparatus main body is detected and based on a detection result, content to be displayed on the display unit is determined, making it possible to provide an image forming apparatus capable of improving user operability and a method of controlling the image forming apparatus.

(Others)

The present invention can be implemented in image forming apparatuses such as MFPs, facsimile apparatuses, copiers, and PCs.

The processes in the aforementioned embodiment may be performed by software or may be performed using a hardware circuit.

A program that performs the processes in the aforementioned embodiment can also be provided and the program may be stored in a storage medium, such as a CD-ROM, a flexible disk, a hard disk, a ROM, a RAM, or a memory card, and then provided to a user. Alternatively, the program may be downloaded to an apparatus via a communication line such as the Internet.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image forming apparatus comprising:
   a transmitting portion that transmits information from an apparatus main body to a removable display unit;
   a position detecting portion that detects a positional relationship between the display unit being removed and the apparatus main body;
   a condition detecting portion that detects a condition of the apparatus main body;
   a storage portion that stores a description of a handling operation indicating an operation to be performed to the apparatus main body by an operator, the description of the handling operation being associated with the positional relationship and the condition of the apparatus main body; and
   a controlling portion that obtains a corresponding description of the handling operation from the storage portion based on the positional relationship detected by the position detecting portion and the condition of the apparatus main body detected by the condition detecting portion, and transmits the corresponding description of the handling operation utilizing the transmitting portion.

2. The image forming apparatus according to claim 1, wherein the display unit includes an information receiving portion, an information transmitting portion, and a displaying portion.

3. The image forming apparatus according to claim 1, wherein
the display unit can be mounted at any location of the apparatus main body, and
the position detecting portion detects a mounting location of the display unit as the positional relationship.

4. The image forming apparatus according to claim 1, wherein
the display unit can be held at any location with respect to the apparatus main body, and
the position detecting portion detects a location where the display unit is held, as the positional relationship.

5. The image forming apparatus according to claim 1, further comprising:
a direction detecting portion that detects a direction of the display unit, wherein the controlling portion obtains the corresponding description of the handling operation from the storage portion, further based on the detected direction of the display unit.

6. The image forming apparatus according to claim 1, further comprising
a user identifying portion that identifies a user who uses the display unit, wherein
the controlling portion obtains the corresponding description of the handling operation from the storage portion, further based on the identified user.

7. The image forming apparatus according to claim 1, further comprising:
a direction detecting portion that detects a tilt of the display unit, wherein
the controlling portion obtains corresponding description of the handling operation from the storage portion, further based on the detected tilt of the display unit.

8. The image forming apparatus according to claim 1, further comprising
a display mode detecting portion that detects a display mode, wherein the controlling portion obtains a corresponding description of the handling operation from the storage portion, further based on the display mode detected by the display mode detecting portion.

9. The image forming apparatus according to claim 1, wherein the description of the handling operation includes an illustration showing the apparatus main body viewed from a direction of the display unit in a condition of the positional relationship.

10. A method of controlling an image forming apparatus including a transmitting portion that transmits information from an apparatus main body to a removable display unit, the method comprising the steps of:
detecting a positional relationship between the display unit being removed from the apparatus main body and the apparatus main body;
detecting a condition of the apparatus main body;
obtaining a description of a handling operation indicating an operation to be performed on the apparatus main body by an operator from a storage portion, based on the positional relationship detected in the step of detecting a positional relationship and the condition of the apparatus main body detected in the step of detecting a condition; and
transmitting a corresponding description of the handling operation utilizing the transmitting portion.

11. The method of controlling an image forming apparatus according to claim 10, further comprising a step of detecting a direction of the display unit, wherein the corresponding description of the handling operation is based on the detected direction of the display unit.

12. The method of controlling an image forming apparatus according to claim 10, further comprising a step of identifying a user who uses the display unit, wherein the corresponding description of the handling operation is based on based on the identified user.

13. The method of controlling an image forming apparatus according to claim 10, further comprising a step of detecting a tilt of the display unit, wherein the corresponding description of the handling operation is based on the detected tilt of the display unit.

* * * * *